United States Patent
Torng et al.

(10) Patent No.: US 6,428,714 B1
(45) Date of Patent: Aug. 6, 2002

(54) PROTECTIVE LAYER FOR CONTINUOUS GMR DESIGN

(75) Inventors: Chyu-Jiuh Torng, Pleasanton; Chen-Jung Chien, Sunnyvale; Kochan Ju, Fremont; Jei-Wei Chang, Cupertino, all of CA (US)

(73) Assignee: Headway Technologies, Inc., Milpitas, CA (US)

( * ) Notice: Subject to any disclaimer, the term of this patent is extended or adjusted under 35 U.S.C. 154(b) by 94 days.

(21) Appl. No.: 09/584,426

(22) Filed: Jun. 5, 2000

(51) Int. Cl.$^7$ ............................................. G11B 5/127
(52) U.S. Cl. ........................ 216/22; 216/40; 216/47; 216/66; 216/75; 216/76; 216/77; 216/78; 360/313; 360/314; 430/323; 430/324; 430/325
(58) Field of Search ........................ 216/22, 40, 41, 216/47, 63, 66, 75, 76, 77, 78; 438/717; 360/313, 314, 322; 430/322, 323, 324, 325, 326

(56) References Cited

U.S. PATENT DOCUMENTS

| | | | | |
|---|---|---|---|---|
| 5,491,600 A | | 2/1996 | Chen et al. | ................. 360/113 |
| 5,637,235 A | * | 6/1997 | Kim et al. | ..................... 216/22 |
| 5,731,936 A | | 3/1998 | Lee et al. | ................... 360/113 |
| 5,883,764 A | | 3/1999 | Pinarbasi | .................... 360/113 |
| 5,985,162 A | | 11/1999 | Han et al. | ..................... 216/22 |
| 6,228,276 B1 | * | 5/2001 | Ju et al. | ....................... 216/22 |
| 6,278,589 B1 | * | 8/2001 | Gill | ............................. 360/314 |

FOREIGN PATENT DOCUMENTS

| JP | 11-86233 | * | 3/1999 | ........... G11B/5/39 |
|---|---|---|---|---|
| JP | 2000150235 | * | 5/2000 | ........... H01F/10/26 |

* cited by examiner

*Primary Examiner*—Randy Gulakowski
*Assistant Examiner*—J Smetana
(74) *Attorney, Agent, or Firm*—George O. Saile; Stephen B. Ackerman

(57) ABSTRACT

An improved process for manufacturing a spin valve structure that has buried leads is disclosed. A key feature is the inclusion in the process of a temporary protective layer over the seed layer on which the spin valve structure will be grown. This protective layer remains in place while the buried leads as well as longitudinal bias means are formed. Processing includes use of photoresist liftoff. The protective layer is removed as a natural byproduct of surface cleanup just prior the formation of the spin valve.

20 Claims, 3 Drawing Sheets

PROTECTIVE LAYER FOR CONTINUOUS GMR DESIGN

This application is related to U.S. Ser. No. 09/584,424 filed on Jun. 5, 2000, assigned to a common assignee.

FIELD OF THE INVENTION

The invention relates to the general field of GMR read heads for magnetic disk systems with particular reference to use of buried leads and photoresist processes therewith,

BACKGROUND OF THE INVENTION

Read-write heads for magnetic disk systems have undergone substantial development during the last few years. In particular, older systems in which a single device was used for both reading and writing, have given way to configurations in which the two functions are performed by different structures, The magnetic field that 'writes' a bit at the surface of a recording medium is generated by a flat coil whose magnetic flux is concentrated within two pole pieces that are separated by a small gap (the write gap). Thus, most of the magnetic flux generated by the flat coil passes across this gap with peripheral fields extending out for a short distance where the field is still powerful enough to magnetize a small portion of the recoding medium.

The present invention is concerned with the manufacture of the read element, This is a thin slice of material located between two magnetic shields, one of which is also one of the two pole pieces mentioned above. The principle governing operation of the read sensor is the change of resistivity of certain materials in the presence of a magnetic field (magneto-resistance). In particular, most magnetic materials exhibit anisotropic behavior in that they have a preferred direction along which they are most easily magnetized (known as the easy axis). The magneto-resistance effect manifests itself as a decrease in resistivity when the material is magnetized in a direction perpendicular to the easy axis, said decrease being reduced to zero when magnetization is along the easy axis. Thus, any magnetic field that changes the direction of magnetization in a magneto-resistive material can be detected as a change in resistance.

It is now known that the magneto-resistance effect can be significantly increased by means of a structure known as a spin valve. The resulting increase (known as Giant magneto-resistance or GMR) derives from the fact that electrons in a magnetized solid are subject to significantly less scattering by the lattice when their own magnetization vectors (due to spin) are parallel (as opposed to anti-parallel) to the direction of magnetization of the solid as a whole.

The key elements of a spin valve structure are, in addition to a seed layer and a cap layer, two magnetic layers separated by a non-magnetic layer. The thickness of the non-magnetic layer is chosen so that the magnetic layers are sufficiently far apart for exchange effects to be negligible (the layers do not influence each other's magnetic behavior at the atomic level) but are close enough to be within the mean free path of conduction electrons in the material. If, now, these two magnetic layers are magnetized in opposite directions and a current is passed through them along the direction of magnetization, half the electrons in each layer will be subject to increased scattering while half will be unaffected (to a first approximation). Furthermore, only the unaffected electrons will have mean free paths long enough for them to have a high probability of crossing the non magnetic layer. However, once these electron 'switch sides', they are immediately subject to increased scattering, thereby becoming unlikely to return to their original side, the overall result being a significant increase in the resistance of the entire structure.

In order to make use of the GMR effect, the direction of magnetization of one of the layers must be permanently fixed, or pinned. Pinning is achieved by first magnetizing the layer (by depositing and/or annealing it in the presence of a magnetic field) and then permanently maintaining the magnetization by over coating with a layer of antiferromagnetic material. The other layer, by contrast, is a "free layer" whose direction of magnetization can be readily changed by an external field (such as that associated with a bit at the surface of a magnetic disk).

On Feb. 5, 1999, application Ser. No. 09/244,882, entitled "Magnetoresistive (MR) sensor element with sunken lead structure" was filed with the US Patent Office. This document discloses the structure shown in FIG. 1, along with a process for manufacturing it. Shown there is a substrate 11 (usually a dielectric material such as aluminum oxide) which has been ion milled to give its central portion the shape of a mesa (shown as 18). On the top of the mesa is seed layer 16 over which GMR sensor 15, a complex of several layers, as discussed above, has been formed. On the area surrounding the mesa 18, conductive leads 12 have been formed. These generally have the shape of a pair of stripes separated by seed layer 16. They may comprise a single material or a laminate of several materials.

Seed layer 13 has been deposited onto the leads 12 and then overcoated with a pair of longitudinal bias stripes 14. The latter are made of a suitable magnetic material and, in the finished device, are permanently magnetized in a direction parallel to the surface of seed layer 16. Their purpose is to prevent the formation of multiple magnetic domains in the free layer portion of the GMR sensor, particularly near its ends.

While the structure shown in FIG. 1 has proven to be an effective package for a GMR sensor and its leads, early versions of said structure were found to exhibit lower than expected GMR ratios. The cause of this problem was found to be the presence of an oxide layer at the interface between layers 15 and 16. The present invention is directed to finding a solution to this problem.

A routine search of the prior art was performed but no references that describe the solution disclosed in the present invention were encountered. Several references of interest were found, however. For example in U.S. Pat. No. 5,985,162, Han et al. show a conductive lead process using a PMGI/PR bilayer structure. Chen et al. (U.S. Pat. No. 5,491,600) and Pinarbasi (U.S. Pat. No. 5,883,764) show other conductive lead processes/etches using a PMGI/PR bilayer structure while Lee et al. (U.S. Pat. No. 5,731,936) show a seed layer for a MR.

SUMMARY OF THE INVENTION

It has been an object of the present invention to provide an improved process for the manufacture of a sensing element for a magnetic disk system.

Another object of the invention has been that said sensing element be based on the GMR effect and have buried leads.

A further object has been that said process include a photoresist liftoff step.

These objects have been achieved by including in the process deposition of a protective layer over the seed layer on which the spin valve structure will be grown. This protective layer remains in place while buried leads and longitudinal bias means are formed, including use of a photoresist liftoff process. It is removed as a natural byproduct of surface cleanup just prior the formation of the spin valve.

DESCRIPTION OF THE PREFERRED EMBODIMENTS

Figure 1:
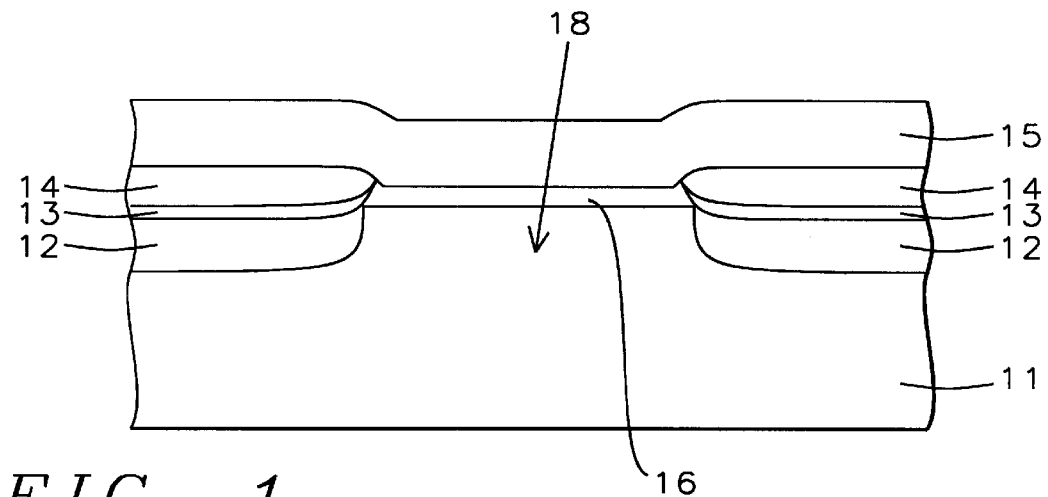
FIG. 1 is a schematic cross-section of the structure whose performance is to be improved through the process of the present invention.
Figure 2:
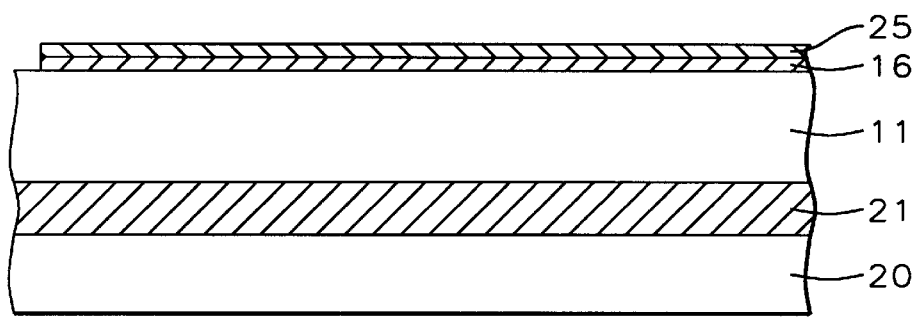
FIG. 2 shows the starting point of the process of the present invention.

We begin an account of the process of the present invention by referring to FIG. 2. Shown there is support element 20 on which magnetic shield 21 has been deposited. This is one of the two shields that flank the GMR sensor element. It is shown in this, and subsequent figures, for reasons of completeness although it is not germane to the specific process of the invention itself.

The process of the present invention begins with the deposition onto shield layer 21 of dielectric layer 11. Then, seed layer 16 is deposited over dielectric layer 11. The material for seed layer 16 could be tantalum, nickel-chromium, nickel-iron-chromium, or zirconium and it is deposited to a thickness between about 20 and 150 Angstroms.

Then, in a departure from our own previous practice as well as from the known prior art, protective layer 25 of a non-magnetic material is deposited on seed layer 16. This protective layer is required to have certain properties. These include:

(a) a high sputtering yield so that it may be removed more rapidly than surrounding material, thereby eliminating any need to mask surrounding material during its removal (b) it should form an oxide that is readily soluble in a basic developer such as KOH or ammonium persulfate so that any oxide that should happen to form during processing can be readily removed.

(c) it should have a crystal structure similar to that of the seed layer so that if some of it should be left behind, inadvertently or intentionally (see below), proper seeding of the next layer will still occur.

Our preferred choice for the protective layer has been copper but other materials such as gold, platinum, silver, or palladium could have been used. These five metal are considered to have high sputtering yields, ranging from 2.3 atoms/ion for copper to 3.4 atoms/ion for silver (at 600V). The protective layer is deposited to a thickness between about 20 and 80 Angstroms. The deposition of both layers 16 and 25 is to be performed in a non-oxidizing atmosphere, preferably without breaking vacuum between the two depositions.

Figure 3:
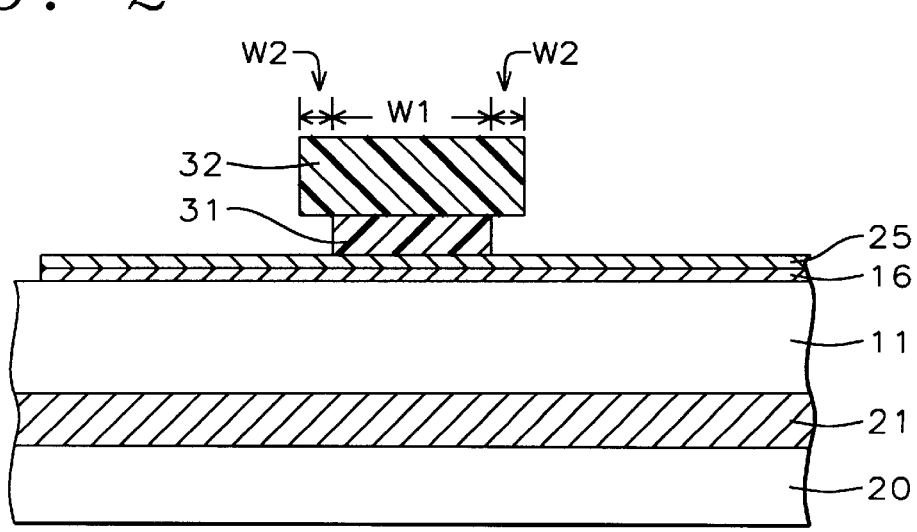
FIG. 3 illustrates the placement of a liftoff mask on the surface of the structure seen in FIG. 2.

Referring now to FIG. 3, a liftoff mask, made up of upper and lower portions 32 and 31 respectively, is laid down on the surface of protective layer 25. The lower mask portion 31 is a photosensitive resin such as polydimethylglutarimide (PMGI) that may be patterned in the same way as conventional photoresist but that can be easily dissolved in solvents such as NMP (N-methylpyrrolidone) or KOH. The upper mask portion 32 is a conventional photoresist pattern that uniformly overlaps lower portion 31. The width WI of the lower mask portion is between about 0.05 and 1 microns while the amount of overhang W2 by the upper mask portion is between about 0.1 and 1.5 microns.

Figure 4:
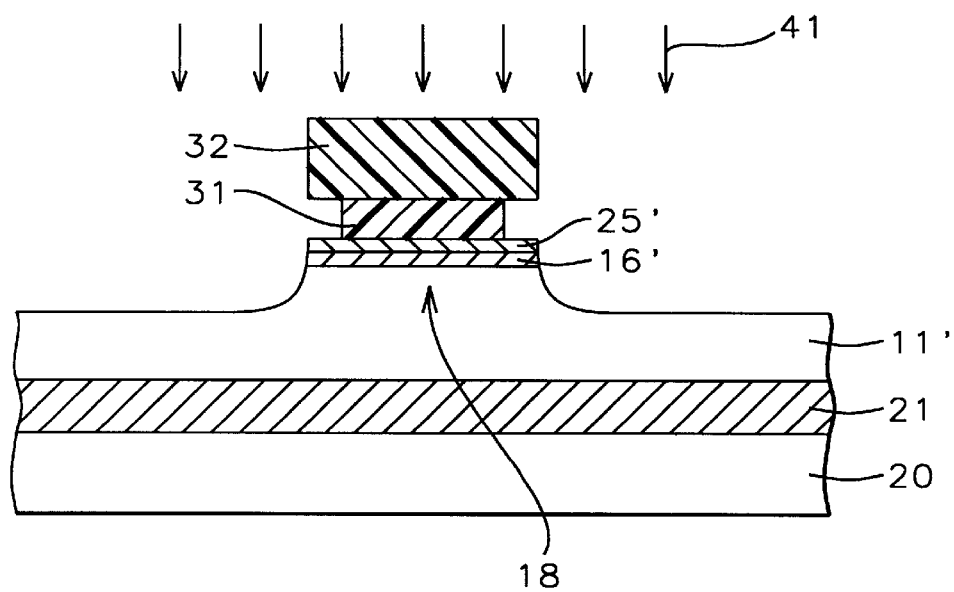
FIG. 4 illustrates the formation of a mesa-like structure suitable for the introduction of buried leads.

Moving on to FIG. 4, we illustrate there the effects of subjecting the structure of FIG. 3 to uniform bombardment by ion stream 41, a process referred to as ion beam etching or milling. The result is the removal of material from all areas not directly beneath upper mask portion 32, leading to the formation of mesa 18. Removed from the areas surrounding mesa 18 is all of the seed layer 16 (leaving behind seed layer 16' under mask 32) and all of protective layer 25 (leaving behind protective layer 25' under mask 32) as well as about half of dielectric layer 11 (now designated as layer 11').

Figure 5:
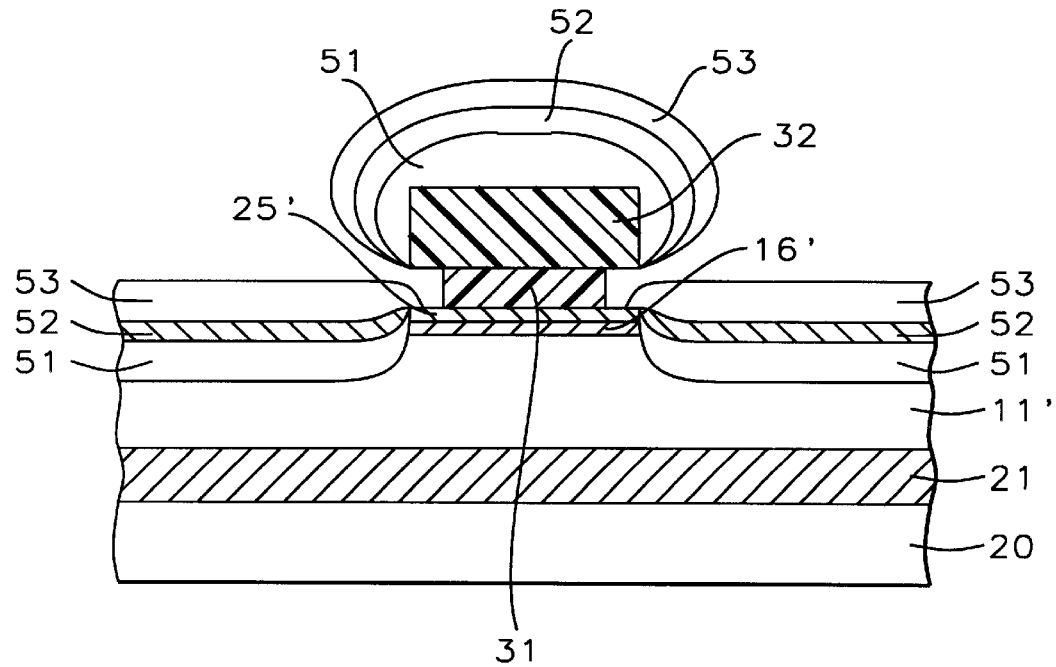
FIG. 5 shows the structure just prior to liftoff.

Referring now to FIG. 5, once mesa 18 (FIG. 4) has been given sufficient height above its surroundings (between about 30 and 450 Angstroms) the material that will form the leads to the sensor is deposited. This is shown as layer 51 in the figure. In addition to depositing in the area around the mesa, this material also deposits over the top and to some extent the sides of mask 32. This, and the layers above it, will subsequently be patterned and etched to form of a pair of buried leads that contact protective layer 25' at opposite ends.

Next, a second seed layer 52 (not necessarily of the same composition as seed layer 16) is deposited, followed by the deposition of magnetic material layer 53 which will serve to provide longitudinal bias to the sensor layer as discussed earlier. The total thickness of layers 51, 52, and 53 is such that the top surface of layer 53 is too low to touch the upper mask portion 32. If they should touch, efficient liftoff would not be possible. Thus when a suitable solvent is applied to the structure it dissolves the lower mask portion 31 so that upper mask portion 32 may be washed away along with all material adhering to 32. It is during this step that the presence of the protective layer 18 is most important since, without it, oxidation of seed layer 16' is liable to occur.

Figure 6:
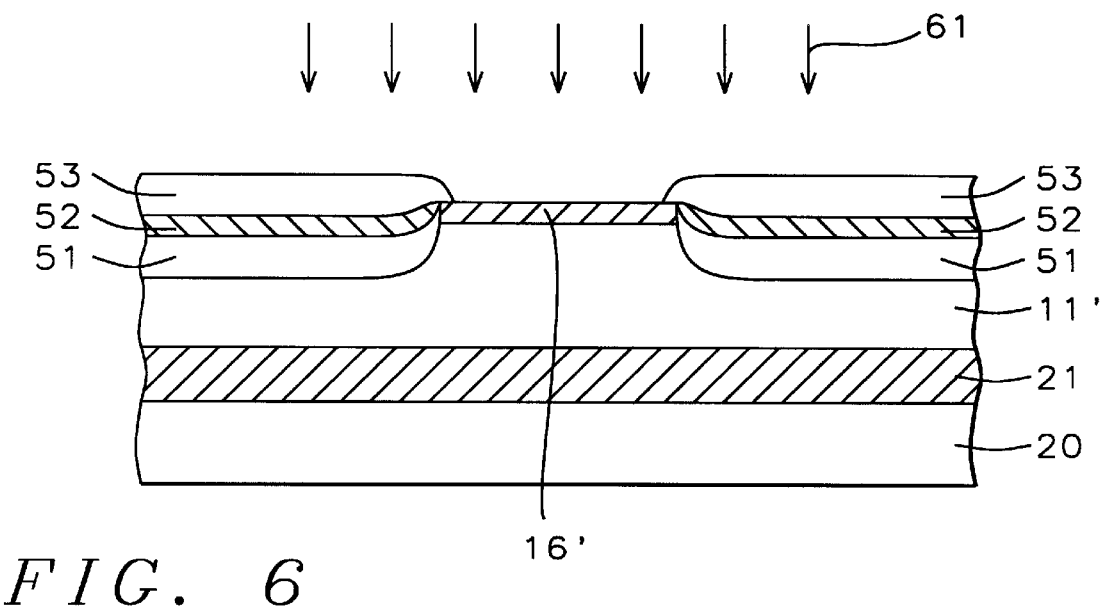
FIG. 6 shows the structure at the conclusion of the process of the present invention.

Once all masking material has been removed, the structure is subjected to sputter cleaning, symbolized by ion stream 61 in FIG. 6. Sputter cleaning may be carried on for long enough to completely remove protective layer 25' or a small amount of it (between about 5 and 25 Angstroms thick) may be left behind. If the latter option is chosen it is particularly important that protective layer 25' and seed layer 16' have similar crystal structures (lattice constants within ±0.5 Angstroms of each other). FIG. 6 illustrates the structure after the protective layer has been fully removed.

Figure 7:
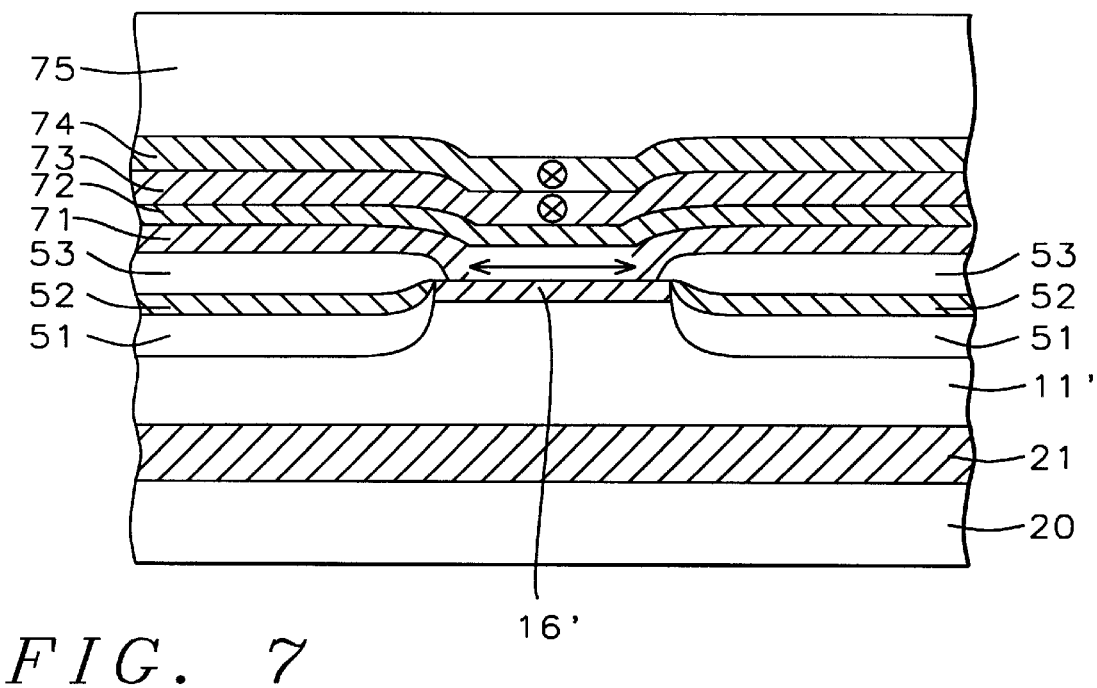
FIG. 7 shows the structure of FIG. 6, including a spin valve structure.

The process of the present invention essentially ends when the structure of FIG. 6 has been achieved. In practice, of course, processing would continue with the formation of a spin valve structure, on the exposed seed layer, that is contacted by the buried leads. We show a schematic representation of the finished product in FIG. 7. Seen there are free layer 71, separation layer 72, pinned layer 73, pinning layer 74, and cap layer 75.

While the invention has been particularly shown and described with reference to the preferred embodiments thereof, it will be understood by those skilled in the art that various changes in form and details may be made without departing from the spirit and scope of the invention.

What is claimed is:

1. A process for improving performance of a spin valve structure, comprising:

providing a substrate;

in a non-oxidizing atmosphere, depositing a seed layer on said substrate;

then, also in the non-oxidizing atmosphere, depositing a protective layer, comprising a non-magnetic material, on the seed layer;

through use of photoresist in a liftoff procedure, forming a pair of buried leads, adjacent to and contacting opposing edges of said protective layer;

removing the photoresist;

then, in a non-oxidizing environment, removing the protective layer, thereby exposing the seed layer; and then forming a spin valve structure on said exposed seed layer.

2. The process of claim 1 wherein the seed layer is selected from the group consisting of tantalum, nickel-chromium, nickel-iron-chromium, and zirconium.

3. The process of claim 1 wherein the seed layer is deposited to a thickness between about 20 and 150 Angstroms.

4. The process of claim 1 wherein the protective layer is selected from the group consisting of copper, gold, platinum, silver, and palladium.

5. The process of claim 1 wherein the protective layer is deposited to a thickness between about 20 and 80 Angstroms.

6. The process of claim 1 wherein the protective layer has a high sputtering yield.

7. The process of claim 1 wherein the protective layer forms an oxide that is readily soluble in an ammonium persulfate solution.

8. The process of claim 1 wherein the protective layer has a crystal structure that is similar to that of the seed layer.

9. A process for improving performance of a spin valve structure, comprising:

providing a substrate;

in a non-oxidizing atmosphere, depositing a seed layer on said substrate;

then, also in the non-oxidizing atmosphere, depositing a protective layer, comprising a non-magnetic material, on the seed layer;

through use of photoresist in a liftoff procedure, forming a pair of buried leads, adjacent to and contacting opposing edges of said protective layer;

removing the photoresist;

then, in a non-oxidizing environment, removing most of the protective layer, whereby an amount of the protective layer, between about 5 and 25 Angstroms thick, remains on the seed layer; and then forming a spin valve structure on said remaining protective layer.

10. The process of claim 9 wherein the protective layer has a crystal structure that is similar to that of the seed layer.

11. The process of claim 9 wherein the protective layer is selected from the group consisting of copper, gold, platinum, silver, and palladium.

12. A process for manufacturing a spin valve structure, comprising the sequential steps of:

providing a substrate and depositing thereon a shield;

depositing a dielectric layer on the shield layer and then depositing a first seed layer on said dielectric layer;

depositing a protective layer of non-magnetic material on the first seed layer;

on the protective layer, forming a mask that further comprises a lower portion, made of a soluble resin, and an upper portion, made of a photoresist material, that uniformly overlaps said lower portion by an amount;

by means of ion beam etching, removing, from areas not directly beneath the upper portion of the mask, all of the seed and protective layers and about half of the dielectric layer, thereby forming a mesa structure and an area surrounding said mesa;

depositing a layer of a lead material which, in the area surrounding the mesa, has the form of a pair of buried leads adjacent to and contacting opposing edges of said protective layer;

depositing a second seed layer, and then a layer of magnetic material, whereby the magnetic material that is on the area surrounding the mesa does not touch the upper mask portion;

applying a solvent that dissolves said lower mask portion thereby causing liftoff of said mask together with all material adhering to the mask, thereby exposing the protective layer;

removing the exposed protective layer by means of sputter cleaning, thereby exposing the first seed layer; and on the exposed first seed layer, forming a spin valve structure that is contacted by the buried leads.

13. The process of claim 12 wherein the first seed layer is selected from the group consisting of tantalum, nickel-chromium, nickel-iron-chromium, and zirconium.

14. The process of claim 12 wherein the first seed layer is deposited to a thickness between about 20 and 150 Angstroms.

15. The process of claim 12 wherein the protective layer is selected from the group consisting of copper, gold, platinum, silver, and palladium.

16. The process of claim 12 wherein the protective layer is deposited to a thickness between about 20 and 80 Angstroms.

17. The process of claim 12 wherein the protective layer has a high sputtering yield.

18. The process of claim 12 wherein the protective layer forms an oxide that is readily soluble in an ammonium persulfate solution.

19. A process for manufacturing a spin valve structure, comprising the sequential steps of:

providing a substrate and depositing thereon a shield;

depositing a dielectric layer on the shield layer and then depositing a first seed layer on said dielectric layer;

depositing a protective layer of non-magnetic material on the first seed layer;

on the protective layer, forming a mask that further comprises a lower portion, made of a soluble resin, and an upper portion, made of a photoresist material, that uniformly overlaps said lower portion by an amount;

by means of ion beam etching, removing, from areas not directly beneath the upper portion of the mask, all of the seed and protective layers and about half of the dielectric layer, thereby forming a mesa structure and an area surrounding said mesa;

depositing a layer of a lead material which, in the area surrounding the mesa, has the form of a pair of buried leads adjacent to and contacting opposing edges of said protective layer;

depositing a second seed layer, and then a layer of magnetic material, whereby the magnetic material that is on the area surrounding the mesa does not touch the upper mask portion;

applying a solvent that dissolves said lower mask portion thereby causing liftoff of said mask together with all material adhering to the mask, thereby exposing the protective layer;

by means of sputter cleaning, removing most of the protective layer, whereby an amount of the protective layer, between about 5 and 25 Angstroms thick, remains on the first seed layer; and on the protective layer remaining over the first seed layer, forming a spin valve structure that is contacted by the buried leads.

20. The process of claim 19 wherein the protective layer has a crystal structure that is similar to that of the first seed layer.

* * * * *